Aug. 25, 1964     H. MORGENROTH     3,145,527
SCAVENGING FLOW CIRCUIT FOR STIRLING CYCLE ENGINE
Filed June 22, 1962     2 Sheets-Sheet 1
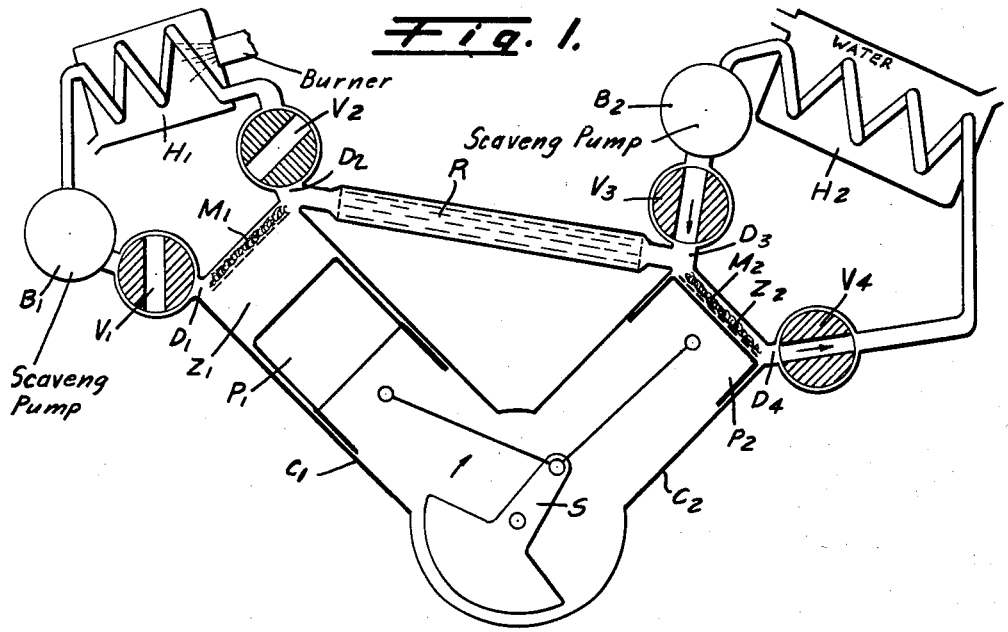
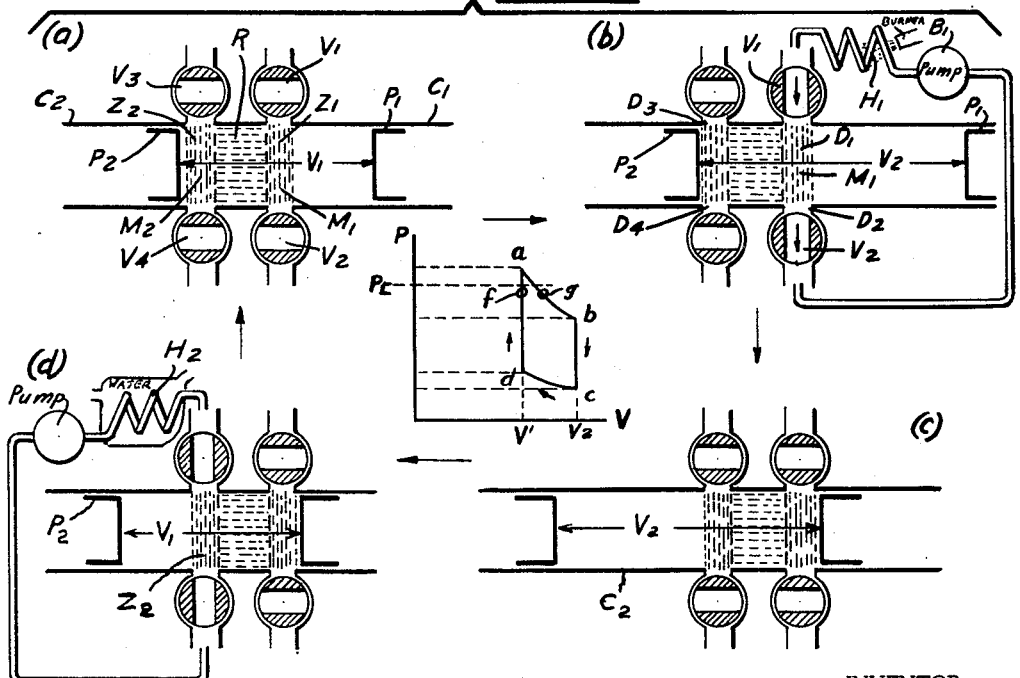
INVENTOR,
Henri Morgenroth.

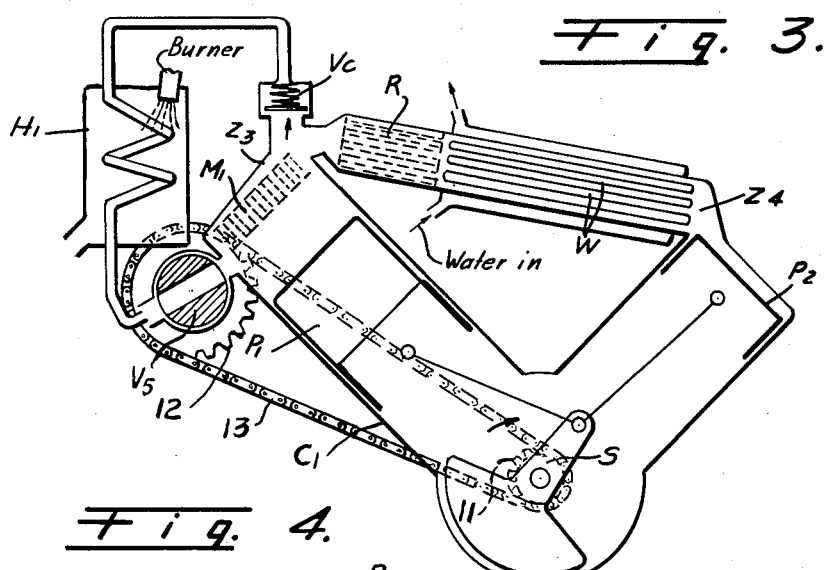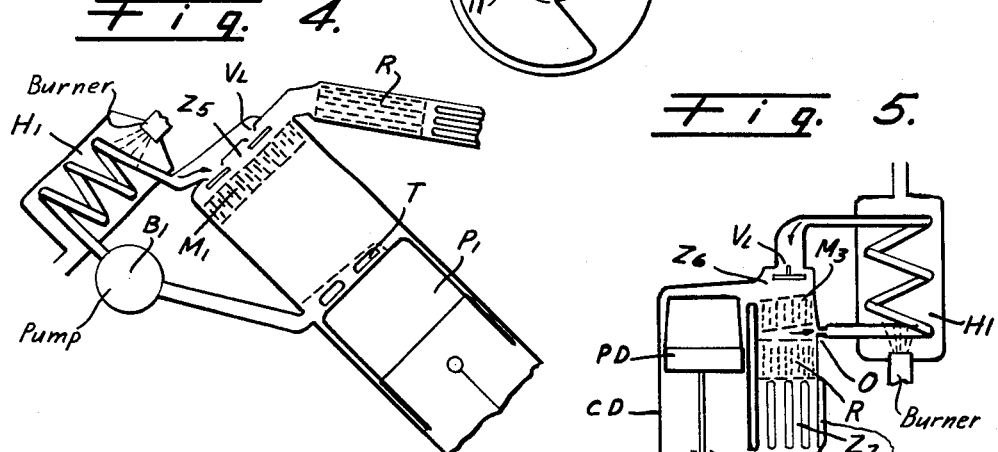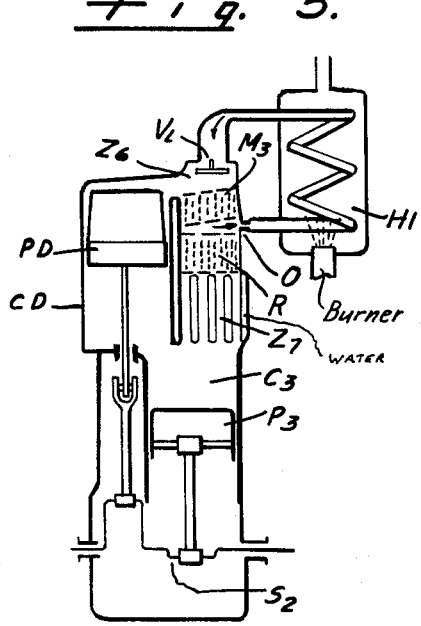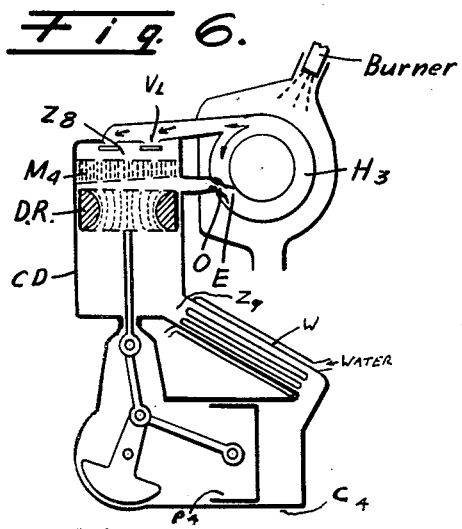

United States Patent Office 3,145,527
Patented Aug. 25, 1964

3,145,527
SCAVENGING FLOW CIRCUIT FOR STIRLING
CYCLE ENGINE
Henri Morgenroth, 3090 Hidden Valley Lane,
Santa Barbara, Calif.
Filed June 22, 1962, Ser. No. 204,382
9 Claims. (Cl. 60—24)

The invention concerns an improvement of the heat transfer of Stirling Cycle Engines (which are also known in a more restrictive sense as hot air engines).

The Stirling cycle is commonly accomplished with either two working pistons which are about 90° out of phase, or one working piston and one displacer piston, also at about a 90° phase angle.

Since the thermodynamics of both devices are identical, and since the working of the cycle can more easily be analysed on hand of the device with two working pistons, the application of the invention to the latter device is described first.

The Stirling cycle is a closed cycle in which the gas charge acting on the working piston is alternately heated and cooled, this heating and cooling taking place at the hot zone and cold zone respectively. Since it is a closed cycle, the heat exchange has to be done through the walls of the zones, thus demanding large zone walls or heat exchange areas.

The disadvantage of this heat-conduction through walls is that the heat exchanger wall areas are limited; with the wall area the volume of the zones increase, which is strongly detrimental to the output and efficiency of the cycle (even though, in the ideal cycle with a 100% regenerator efficiency, a clearance volume increase does not decrease the efficiency, in all practical cycles the clearance volume, formed by the zones has to be kept as small as possible). The invention offers a way out of this basic incompatibility of the demand for large heat exchange surfaces and yet small hot and cold zone volumes. It does this by removing the heat exchange to separate pressure vessels which can now have an unlimited volume, and connecting these separate heat exchangers only during a portion of the cycle with the Stirling engine proper. The function and the advantages of this arrangement will become more apparent during the course of the description.

Further advantages may be brought out in following part of the specification wherein the preferred embodiment of the invention is described for the purpose of making a complete disclosure without intending, however, to limit the scope of the invention defined by the appended claims.

FIGURE 1 shows schematically a conventional Stirling Cycle Engine with the two working piston type, with the heat exchanger device according to the invention.

FIGURE 2 shows the cycle for this engine in its idealized form, broken down into the four main positions of the pistons.

FIGURES 3 and 4 show a modified form of the invention.

FIGURES 5 and 6 show the application of the invention to the displacer type Stirling engine, combined with other modifications of the invention.

Referring first to the conventional parts of the Stirling engines in FIGURES 1 and 2, R denotes the regenerator, $Z_1$ the hot zone, $Z_2$ the cold zone, $P_1$ the hot zone piston, $P_2$ the cold zone piston, which are moving in hot cylinder $C_1$ and the cold cylinder $C_2$ respectively, being driven at 90° phase difference by a crankshaft S or other equivalent means.

FIGURE 1 shows the way in which a two piston Stirling engine can be actually designed, whereas, FIGURE 2 demonstrates the working of FIGURE 1 in idealized form.

In FIGURE 2 the P.V. diagram of the ideal Stirling Cycle with Carnot efficiency is depicted in the center. The piston positions corresponding to the four corners of this idealized diagram $a$, $b$, $c$ and $d$ are shown marked with corresponding letters.

In the drawing (which corresponds to the corner $a$ of the diagram) the position of both pistons is such that most of the working gas is located in the hot cylinder $C_1$.

From $a$ to $b$ isothermic expansion takes place, by moving the piston $P_1$ to its maximum volume position $V_2$. Heat for this isothermic expansion is added to the hot zone $Z_1$.

From $b$ to $c$ both pistons are moved equal amounts, so that the working gas is transferred into the cold cylinder $C_2$. The volume during this transfer remains $V_2$ and no work is done. The regenerator matrix R (which is charged with a heat gradient from the cold to the hot zone), extracts heat from the gas charge, so that the low pressure point C on the diagram is reached.

From $c$ to $d$ the cold piston $P_2$ compresses the working gas. The cold zone $Z_2$ rejects heat, so that this compression is isothermic.

From $d$ to $a$ both pistons move again equal amounts, transferring the working gas back to the hot cylinder $C_1$. On its way the gas extracts the heat from the regenerator, which was stored there during the movement $b$–$c$.

In the conventional Stirling engine the heat addition in zone $Z_1$ and heat extraction in zone $Z_2$ is accomplished by means of heat transfer through the limited amount of available wall area.

So far conventional components and functioning of the Stirling Cycle Engine have been discussed.

In the following description the novel features, added to the conventional Stirling engine, will be explained.

In the form of execution of FIGURE 1 and FIGURE 2 the heat addition and extraction is done by means of wire mesh matrixes $M_1$ and $M_2$ which are located in the zones. Wires or fibers in the order of half a thousandth of an inch thickness, filling the zones to, for instance 25%, have a multiple of the heat transfer surface of a heat exchanger built from the smallest possible heat exchange tubes. Thus, the added clearance volume, necessary to house the matrix is only a fraction of that required by conventional heat exchangers in the zones.

According to the invention the hot zone matrix is heat charged by means of a timed scavenge flow of gas, flowing through the matrix after entering the Duct $D_1$ and leaving the zone again at Duct $D_2$.

On the heat rejection side, a second scavenge loop may be arranged which enters and discharges the scavenge gas through the ducts $D_3$ and $D_4$.

These scavenge gas chargers are propelled by means of scavenge pumps or blowers $B_1$ and $B_2$. These scavenge gas chargers respectively receive and reject heat in the heat exchangers $H_1$ and $H_2$.

The part of the invention, which makes it possible to give these heat exchangers $H_1$ and $H_2$ large volumes and large areas lies in the shutoff devices or valves $V_1$, $V_2$, $V_3$ and $V_4$ at the in and out Ducts of the zones.

The reason why the timing accomplished with these valves is decisive is the following: If the scavenge circuits would be in constant communication with the Stirling engine gas charge, they would undergo the complete pressure cycle and thus simply add to the clearance volume. With the help of the valves, however, the scavenging circuits are kept separate from the Stirling engine during most of the cycle while pressure changes take place, and are connected to the Stirling cycle only during periods of minor or no pressure changes. Thus, the gas charges in the scavenge circuit heat exchangers remains at essentially constant pressures. No matter how large the volume of the heat exchanger, it does not increase the Stirling engine clearance volume because the valves stay open only during the same constant pressure level of each cycle, thus preventing the gas filling of the scavenge devices and heat exchangers to participate in the fluctuating pressure cycle.

The point of the cycle at which the scavenging circuit is opened to the Stirling engine is of no influence on the thermodynamics of the cycle, as long as the opening time is short enough that no detrimental pressure change in the scavenge circuit takes place.

For the sake of achieving the longest possible scavenging time a part of the cycle is chosen during which the pressure level is nearly constant over a maximum amount of crankshaft rotation.

It is even possible to open the scavenging circuit twice during each cycle, for instance, for a short stretch of $b$ and $c$ and again at a second short stretch between $d$ and $a$, when the same pressure level is reached again.

Despite the theoretical desirability to open the scavenging circuit to the Stirling cycle only during periods of constant pressure, in practical applications a compromise has to be made. In order to reduce the scavenge gas velocity, and therewith the power requirements for the scavenging pump, the valves are kept open over longer periods of time (for instance 90°) during which some pressure changes occur. The clearance volume formed by the heat exchangers during this prolonged connection time reduces pressure changes and thus the work area of the P.V. diagram. In this compromise the reduced power requirements of the scavenging pumps have to be balanced against the power loss in the Stirling cycle.

In the example shown in FIGURE 2 the scavenging circuit of the Heater $H_1$ is opened in the vicinity of point B the scavenging circuit for the heat rejector $H_2$ is opened at a different pressure level, at point $d$. Thus, both circuits carry different pressures.

From the foregoing discussion it is, however, apparent that both circuits could do the scavenging at the same pressure levels. This is especially important if the Stirling engine is charged only with ambient gas pressure.

The remote heating and cooling of scavenge system according to the invention can, with proper valve timing, also be made to work without the use of the heat storing matrixes $M_1$ and $M_2$, the result being lower efficiency. In this form of execution, the scavenging charge simply replaces the gas charge in the zone $Z_1$ which has undergone a temperature drop after doing work from $a$ to $b$, by a new gas charge with higher temperature. For the cold zone scavenge circuit at zone $Z_2$, the fresh gas charge is, of course, cooler than the charge in the zone which it displaces, since this charge has undergone a compression from $c$ to $d$.

The reason for the lower efficiency is the following: Without the matrix, the legs $a$–$b$ and $c$–$d$ of the cycle are no longer isotherms, but theoretically adiabates. A Stirling cycle run between adiabates has less than Carnot efficiency. Nevertheless, in small engines if the matrixes are left out, the cylinder walls and the ends of the regenerator store sufficient amounts of heat to run the cycle with polytrops which are for all practical purposes sufficiently close to the ideal isotherms. In other words, the zone walls partly replace the matrixes. Without the use of matrixes in the zones, the scavenge pressure can be reduced.

A complete change in the gas charge by means of the scavenging process is by no means necessary. The scavenge gas charge will be at temperature levels respectively above and below the hot and cold zone temperatures. If only part of the zone gas charge is replaced during the scavenging process, the recharging and discharging of the heat will partly be accomplished by mixing the original gas and scavenge gas charges. The smaller the scavenge gas charge is, the higher will be the temperature step between $H_1$ and $Z_1$ (or $H_2$ and $Z_2$). This temperature step is an irreversible loss. Thus, it is theoretically desirable to operate with a large scavenge flow which reduces this step. In praxis, however, the scavenging flow power requirements must again be weighted against the efficiency loss from this temperature step, so that for each application a proper compromise can be chosen.

In the form of execution with the matrix, it is not essential that the scavenge gas flow completely crosses the matrix. In FIGURE 1 at the zone $Z_1$ the scavenge flow coming from the Duct $D_1$ will largely bypass the matrix $M_1$ before displacing the "spent" gas charge in $Z_1$ and discharging it at $D_2$.

Here a mixed matrix charging and gas displacing process takes place. Furthermore, the scavenging sets up a strong turbulence, which crosses the matrix, even after completion of the scavenge process. Thus, the matrix with its large heat storage capacity will act to maintain more nearly isothermic expansion and compression. The continuous turbulence will extend the function of the matrix over the duration of the entire cycle process, rather than confine it to a short period of scavenging as shown in position "$b$" of FIGURE 2.

The advantage of this bypassing of the matrix during the scavenge process is, besides simplicity of design, a reduction in the power requirement for the scavenge process.

The advantages of this heating and cooling by means of the remote heat exchangers and the scavenge process are manifold:

(A) The former severe limitation in the size of the heat exchanger areas is eliminated. Thus, the efficiency of the Stirling engine can be raised, since the large temperature difference between the heater gases coming from the burner and the hot zone walls will be reduced with the increase in heat exchange wall area. Furthermore, the increased heat exchanger wall area decreases the necessity for high scrubbing velocities of the burner gases.

(B) In the conventional Stirling engine, the proximity of the heat exchange to the engine creates great design problems and limitations.

The new scavenge process makes it possible to locate the heater and cooler remotely from the engine proper.

(C) In multicylinder engines, the conventional Stirling engine needs one heater for each hot zone. (That is for each working cylinder.)

With the scavenge process, all heaters can be combined into a single unit. Since the pressure level in each hot zone (or, respectively cold zone) scavenge loop is nearly constant and equal, the scavenge ducts coming and going to each cylinder can be joined into a common heater (or cooler) coil and the scavenge gas charges can be driven by a common scavenging pump.

This single remotely located heater for large multicylinder installation, will indeed make the Stirling process practical for large outputs. It makes possible installations comparable to steam engines, with their separate boilers, but with higher efficiency than that reached with the Rankine cycle.

(D) The efficiency of the Stirling engine itself will be increased since the detrimental clearance volume of the zones can be kept smaller than in the conventional Stirling engine.

(E) The new heating system makes it possible to use the Stirling engine with its high efficiency for nuclear power production. The heater $H_1$ can be formed by a reactor.

With the conventional Stirling engine, a secondary heat transmitting loop of, for instance, sodium, between the reactor and the engine, is necessary. With the new remote heating system, however, the gas charge of the gas cooled reactor can double as the working gas of the Stirling engine, thus eliminating the complexity of secondary heat exchangers.

(F) The Stirling process can be used for heat pumps, refrigeration and cryogenic temperature generation.

In all these applications, the remote location of the heat exchangers with large wall areas give obvious new possibilities.

After this general outline of the functioning and advantages of the remote heating and cooling, different forms of execution and details will now be discussed more fully.

The valving at the hot zone presents a problem, since in many applications it will run red hot.

The use of poppet valves can reduce this problem.

The small pressure ratios inherent in the Stirling Cycle make it also possible to use rotary valves with clearances of several thousandths of inches in the valve housing. Here the rotary valve is suspended in bearings which are sufficiently far installed from the gas passage to be kept cool. The bearings center the valve in the somewhat oversize valve body, so that the red hot valves and seats never actually touch. With the small pressure ratio the leakage during the closing time is relatively small.

The same system can be used for rotating disk shaped valves.

FIGURE 3 shows the new remote scavenging and heating system used only at the hot side, whereas, the cooling is done with the conventional water cooled heat exchanger tubes W at the cold zone $Z_4$.

Since the heat transfer to water cooled walls is less of a problem than the heat transfer from burner gases to the hot zone walls, this combination is in many cases preferable.

Another innovation against FIGURE 1 and FIGURE 2 consists of the elimination of the scavenging pump.

This is done by using a small part of the Stirling cycle pressure difference itself to generate the scavenging pressure.

A one way checkvalve $V_c$ controls the inflow to the scavenge loop from the hot zone $Z_3$, while a crankshaft times rotary or poppet or slide valve $V_5$ and controls the returned by means of crankshaft sprocket 11, the timing chain 13, and sprocket 12.

The checkvalve $V_c$ will charge the scavenge loop to the maximum pressure of the cycle.

The valve $V_5$ is timed to open at slightly lower pressures. Thus, some working area of the cycle will be lost, but this loss will be used to power the scavenge flow and eliminate the need of a scavenging pump.

The P.V. diagram of FIGURE 2 explains this situation. At the pressure $P_c$, the checkvalve opens, admitting a charge to the scavenge loop and thus eliminating the small triangular part of the cycle between $P_c$ and $a$.

Shortly under $P_c$, the rotary valve is briefly opened. It is apparent that this lower pressure is crossed twice during each cycle. Consequently, the scavenge flow is established by either opening the valve $V_5$ around point $f$ or point $g$, or at both points, that is twice during each cycle.

A combination of a checkvalve, opening in the other direction, that is inwardly to the zone, and a rotary valve can also be used. Then, the scavenging process is timed to take place around the lowest pressure point $c$ of the P.V. diagram.

The checkvalve may also be replaced by a crankshaft driven valve. To eliminate the scavenging pump the in and outlet valves open at different times and pressure levels, in order to make use of the cyclic pressure changes for the generation of the scavenging pressure.

With the checkvalves, the scavenging has to take place at extreme pressure levels of the cycle.

With two crankshaft driven valves, other than the extreme pressure portion of the cycle can be chosen for the scavenging process.

FIGURE 4 shows still another modification of the invention.

Here, the scavenging is done around point $c$ of the P.V. diagram, by means of a checkvalve $V_L$, which opens toward the hot zone space $Z_5$ at the lowest pressure of the cycle. This checkvalve maintains in the scavenging ducts a pressure close to the lowest cyclic pressure.

The other side of the scavenging loop is controlled by the ports T which are steered by the piston $P_1$.

The scavenging flow displaces here a major part of the cylinder charge, after crossing the matrix $M_1$.

This arrangement may be used either in conjunction with a scavenging pump $B_1$ or, if the timing of the ports is chosen to open at a pressure level higher than the point $c$ of the indicator diagram, without the pump.

Combinations of piston controlled ports with checkvalve as shown in FIGURE 3, or with other rotary or poppet valves are also possible. The opening time of piston controlled ports can be varied by the use of ported sleeves at the piston.

Complete loop scavenging, as known from two cycle engines, with the help of piston controlled ports on the in and out side of the scavenging flow, is also possible.

FIGURES 5 and 6 show the application of the invention to the displacer type of Stirling Cycle Engine.

Referring first to FIGURE 5, the working piston $P_3$ acts on the crankshaft $S_2$. The displacer piston $P_D$ is driven at about 90° phase angle to the working piston, and displaces the working gas in conventional manner through the hot zone $Z_6$ thence, through the regenerator R to the cold zone $Z_7$ with the adjoining working cylinder space $C_3$.

The same scavenging systems as previously described can be used with the displacer type of engine.

However, FIGURE 5 illustrates still another form of execution of the scavenging system.

This consists of a checkvalve $V_L$ which serves the same purpose as $V_L$ in FIGURE 4.

The scavenge flow crosses the matrix $M_3$. Thence, it enters the heater scavenging loop on its way to the heater $H_1$ by way of an orifice O.

In other words, the one end of the scavenge flow is not timed at all, but rather a constant, but strongly restricted scavenge flow communicates with the heater loop.

The restriction O is essential for the working of the system. Without it, obviously the entire loop would participate in the cyclic pressure change, and thus increase the clearance volume.

With a restriction at point O, the pressure in the heater loop will only increase a fraction of the total cylinder pressure change above the lowest pressure established by the checkvalve $V_L$.

Thus, the scavenging stream is promoted with the extremely simple combination of one automatic one way valve and one restriction. A certain percentage of reduction of indicator diagram area is experienced with this device. However, for small engines, this powerloss is frequently less detrimental than the complications represented by crankcase controlled valves.

This scavenging system can also be used in conjunction with the two working piston type of Stirling engine.

FIGURE 6 shows the displacer type of Stirling Cycle Engine, where the working cycle $C_4$ with its working piston $P_4$ is arranged in a 90° angle to the displacer cylinder $C_D$.

This FIGURE 6 shows two more modifications of the invention, which can also be used in combination with any of the other previously discussed scavenging systems.

Instead of a displacer piston, a displacer regenerator combination D.R. is used.

Here the regenerator is housed inside the displacer piston, thus simplifying the ducting considerably.

This arrangement, though ordinarily known, was previously not successful, because with the conventional Stirling engine the reciprocating regenerator leaves the gases in the hot zone almost stationary. Thus, the heat transfer was grossly inferior against that of displacer type engines, where the displacer drives the gas charge past the hot zone walls.

With the scavenging system according to the invention this disadvantage no longer exists. The scavenge flow established by the checkvalve $V_L$ and the orifice O crosses the hot zone $Z_8$ and matrix $M_4$ quite independently of the displacer piston action.

Thus, the scavenging system in the form of execution according to the invention makes the use of a simple oscillating regenerator practical.

In the example shown in FIGURE 6 a conventional cold zone $Z_9$ with water cooled tubes W is shown.

This conventional cold zone can be used in conjunction with the oscillating regenerator, since it is shunted between the regenerator and the working piston, thus, promoting a scrubbing velocity, despite the elimination of the conventional displacer piston.

Another novelty is shown in the ejector type E of the restriction O. This promotes a constant gas circulation in the heater duct $H_3$, in the manner indicated by the arrows.

This orifice can also be used to drive a scavenging turbine-impeller combination.

Low output Stirling engines are sometimes operated with an air charge of atmospheric pressure. For such applications, the heater and cooler loops can be open, blowing in heated or respectively cooled gases at one end and discharging the temperature changed gases on the other end. This application is especially important for heat pumps, refrigerators and cryogenic Stirling devices.

When the Stirling engine is used as a heat pump, turning in the same direction, the hot zone assumes a temperature lower than that of the cold zone, yet still acting as a heat receiver or in-gatherer. The invention is equally applicable to heat pump Stirling cycles as to prime mover Stirling cycles.

Therefore, it is to be understood that the conventional term "Hot Zone" refers to the heat in-gathering zone, irrespective of the actual temperature level of the zones.

I claim:

1. A Stirling Cycle Engine, comprising:
   (a) a hot zone; and
   (b) a cold zone;
   (c) a gas flow circuit between said hot zone and said cold zone, said circuit including a regenerator; and
   (d) at least one additional closed loop gas circuit, said additional circuit including an inlet and an outlet to the zone and an exterior heat exchanger and means to recirculate the gas charge through said closed loop gas circuit and said additional circuit arranged to scavenge at least one of said zones in such a manner that at least part of the zone gas charge is replaced by the scavenge gas charge at least once each cycle;
   (e) means to heat a scavenge gas charge in said additional circuit before said charge enters said hot zone to a temperature above the hot zone temperature in the case of the hot zone scavenging circuit, and means to cool the temperature of said additional gas charge below the cold zone temperature in the case of the cold zone scavenging circuit to such an extent that the scavenging gas charge serves as the carrier for heat addition in the case of the hot zone and heat rejection in the case of the cold zone.

2. A Stirling Cycle Engine according to claim 1 in which said regenerator is located in the displacer piston and reciprocates together with said displacer piston.

3. A Stirling Cycle Engine, comprising:
   (a) a hot zone; and
   (b) a cold zone;
   (c) a gas flow circuit between said hot zone and said cold zone, said circuit including a regenerator; and
   (d) at least one additional closed loop gas circuit, said additional circuit including an inlet and an outlet to the zone and an exterior heat exchanger and means to recirculate the gas charge through said closed loop gas circuit and said additional circuit arranged to scavenge at least one of said zones in such a manner that at least part of the zone gas charge is replaced by the scavenge gas charge at least once each cycle;
   (e) means to heat a scavenge gas charge in said additional circuit before said charge enters said hot zone to a temperature above the hot zone temperature in the case of the hot zone scavenging circuit, and means to cool the temperature of said additional gas charge below the cold zone temperature in the case of the cold zone scavenging circuit to such an extent that the scavenging gas charge serves as the carrier for heat addition in the case of the hot zone and heat rejection in the case of the cold zone; and
   (f) at least two shut off devices for said additional gas circuit which control the inlet and outlet of the scavenging circuit to the zone; and
   (g) means to control said shut off devices so that they open at least once during each cycle during the portion of the cycle of relatively small pressure change.

4. A Stirling Cycle Engine according to claim 3 in which the means to control said shut off devices opens said shut off devices at different times and at different pressure levels at the inlet and the outlet of said gas circuit, said different pressure levels promoting the gas flow through the scavenging circuit.

5. A Stirling Cycle Engine according to claim 3 in which the said means to control said shut off devices is crankshaft operated for one shut off device and a one way valve operated by gas pressure for the other said shut off device.

6. A Stirling Cycle Engine, comprising:
   (a) a hot zone; and
   (b) a cold zone;
   (c) a gas flow circuit between said hot zone and said cold zone, said circuit including a regenerator; and
   (d) at least one additional closed loop gas circuit, said additional circuit including an inlet and an outlet to the zone and an exterior heat exchanger and means to recirculate the gas charge through said closed loop gas circuit and said additional circuit arranged to scavenge at least one of said zones in such a manner that at least part of the zone gas charge is replaced by the scavenge gas charge at least once each cycle;
   (e) means to heat a scavenge gas charge in said additional circuit before said charge enters said hot zone to a temperature above the hot zone temperature in the case of the hot zone scavenging circuit, and means to cool the temperature of said additional gas charge below the cold zone temperature in the case of the cold zone scavenging circuit to such an extent that the scavenging gas charge serves as the carrier for heat addition in the case of the hot zone and heat rejection in the case of the cold zone; and
   (f) a shut off device at the inlet or the outlet to the zone, the other end of said gas circuit being continuously connected to said zone, this continuous connecting being a throttling orifice.

7. A Stirling Cycle Engine according to claim 6 in which the throttling orifice is an expanding nozzle arranged to promote the scavenging gas flow.

8. A Stirling Cycle Engine, comprising:
   (a) a hot zone; and
   (b) a cold zone;
   (c) a gas flow circuit between said hot zone and said cold zone, said circuit including a regenerator; and
   (d) at least one additional closed loop gas circuit, said additional circuit including an inlet and an outlet to the zone and an exterior heat exchanger and means to recirculate the gas charge through said closed loop gas circuit and said additional circuit arranged to scavenge at least one of said zones in such a manner that at least part of the zone gas charge is replaced by the scavenge gas charge at least once each cycle;

(e) means to heat a scavenge gas charge in said additional circuit before said charge enters said hot zone to a temperature above the hot zone temperature in the case of the hot zone scavenging circuit, and means to cool the temperature of said additional gas charge below the cold zone temperature in the case of the cold zone scavenging circuit to such an extent that the scavenging gas charge serves as the carrier for heat addition in the case of the hot zone and heat rejection in the case of the cold zone; and (f) a heat storing matrix arranged in the path of at least a part of the scavenging gas flow.

9. Stirling Cycle Engine, comprising:
(a) a hot zone; and
(b) a cold zone;
(c) a gas flow circuit between said hot zone and said cold zone, said circuit including a regenerator; and
(d) at least one additional gas circuit, said additional circuit including an inlet and an outlet to the zone and said additional circuit arranged to scavenge at least one of said zones in such a manner that at least part of the zone gas charge is replaced by the scavenge gas charge at least once each cycle;

(e) means to heat a scavenge gas charge in said additional circuit before said charge enters said hot zone to a temperature above the hot zone temperature in the case of the hot zone scavenging circuit, and means to cool the temperature of said additional gas charge below the cold zone temperature in the case of the cold zone scavenging circuit to such an extent that the scavenging gas charge serves as the carrier for heat addition in the case of the hot zone and heat rejection in the case of the cold zone; and f) at least two shut off devices for said gas circuit which control the inlet and outlet of said gas circuit to the zone, said shut off devices opening substantially simultaneously at least once during each cycle; and (g) a pump in said circuit to promote the scavenge gas flow during the opening time of said shut off devices.

References Cited in the file of this patent

UNITED STATES PATENTS

| | | |
|---|---|---|
| 2,067,453 | Lee | Jan. 12, 1937 |
| 2,643,508 | Clay et al. | June 30, 1953 |
| 2,685,173 | Percival | Aug. 3, 1954 |

FOREIGN PATENTS

| | | |
|---|---|---|
| 13,206 | Great Britain | Sept. 12, 1888 |